US008334781B2

(12) United States Patent
Heck et al.

(10) Patent No.: US 8,334,781 B2
(45) Date of Patent: Dec. 18, 2012

(54) APPARATUS AND METHOD FOR WIRELESS MONITORING

(75) Inventors: Mark Heck, Toms River, NJ (US); Hart Ferrall, Vero Beach, FL (US); Sean Maguire, Dayton, MD (US); Parvez Mansuri, Belle Mead, NJ (US)

(73) Assignee: Mark-It Services, Lakehurst, NJ (US)

( * ) Notice: Subject to any disclaimer, the term of this patent is extended or adjusted under 35 U.S.C. 154(b) by 458 days.

(21) Appl. No.: 12/132,334

(22) Filed: Jun. 3, 2008

(65) Prior Publication Data

US 2009/0237258 A1 Sep. 24, 2009

Related U.S. Application Data

(63) Continuation-in-part of application No. 12/050,449, filed on Mar. 18, 2008, now abandoned.

(60) Provisional application No. 60/909,238, filed on Mar. 30, 2007.

(51) Int. Cl.
*G08B 17/00* (2006.01)

(52) U.S. Cl. ...................... 340/585; 340/540; 340/572.1; 62/129

(58) Field of Classification Search .................... 340/585
See application file for complete search history.

(56) References Cited

U.S. PATENT DOCUMENTS

| 2007/0073460 A1* | 3/2007 | Bertosa et al. .................. 701/29 |
| 2008/0291850 A1* | 11/2008 | Jensen .......................... 370/276 |
| 2008/0297346 A1* | 12/2008 | Brackmann et al. ....... 340/572.1 |
| 2009/0216497 A1* | 8/2009 | Schwiers et al. .............. 702/188 |

OTHER PUBLICATIONS

RefBox Users Manual, York Marine, Controls, Revision 1.3, Mar. 30, 2005.*
"Rail Tough for train, trailer or container GPS tracking and monitoring", Nordic Navigation, Jan. 2002.*

* cited by examiner

*Primary Examiner* — Daniel Wu
*Assistant Examiner* — Frederick Ott
(74) *Attorney, Agent, or Firm* — Sills Cummis & Gross P.C.

(57) ABSTRACT

A method of collecting data from (and sending instructions and data to) a reefer is provided, the method includes the steps of connecting a monitoring device on a reefer at an existing connection port for collecting (and delivering) data related to the reefer and wirelessly transmitting the data. A software management system for collecting and monitoring data of a reefer is also provided, the software management system has a monitoring device for obtaining data from a reefer at an connection port of the reefer and wirelessly transmitting the data, and a software system for receiving the data and monitoring and controlling the status of the reefer based on the data received.

30 Claims, 5 Drawing Sheets

APPARATUS AND METHOD FOR WIRELESS MONITORING

CROSS REFERENCE TO RELATED APPLICATION

This is a continuation-in-part application of application Ser. No. 12/050,449, filed Mar. 18, 2008 now abandoned which claims benefit to provisional application 60/909,238, filed Mar. 30, 2007.

FIELD OF THE INVENTION

The present invention relates to remote monitoring, and more specifically, to remote monitoring and control of mobile refrigerated containers.

BACKGROUND OF THE INVENTION

Refrigerated containers are used in the transportation industry to carry cargo that is temperature and/or time sensitive. Perishable cargo such as fresh, chilled or frozen food products as well as products such as pharmaceuticals, blood plasma, film, batteries and the likes, are also commonly carried in such containers.

Refrigerated containers, or reefers, consist of two main parts—the box/container and the refrigerated machinery. The box is usually similar in shape and size to commonly seen cargo containers, i.e., 20 or 40 feet long by 8 feet wide by 8 feet tall is typical. The box is typically made with a layer of insulating material sandwiched between an outer painted steel shell and an inner stainless steel shell that makes up the walls, floor and roof. At one end of the container are two interlocking doors and at the other end, embedded in the end wall, is the reefer machinery.

The reefer machinery consists of two main parts—the refrigeration apparatus (motor, compressor, refrigerant, evaporators, fans, etc.) and the control computer (or controller, micro or microprocessor). This machinery is accessible on the outside of the container and based on manually inputted settings to the micro (through a keypad or connected handheld device or PC), the machinery switches on and off and blows cold air into the reefer box. When the temperature that was inputted is satisfied, i.e., when the box reaches the required temperature, the micro, based on feedback from a number of sensors embedded in the reefer machinery, will close down the cold air delivery. If the temperature starts to deviate from the set temperature the micro will start up the machinery again and get the temperature within the desired range. It is, in many ways, identical in operation to a common domestic refrigerator—constantly switching on/off to maintain the proper settings.

For the supplier, shipper, agent, shipping line and consignee, it is of great importance that such cargo is maintained within certain temperature or other environmental constraints throughout the shipping process from packing to unpacking and that such cargo is delivered in a timely manner.

Those responsible for the shipping and transportation of such goods go to considerable lengths to try to ensure that the cargo is maintained and delivered to the shipper's and consignee's satisfaction. Typical measures include computer systems that track the manual entry of each container number at key points throughout the transportation chain. For example, these could be at the gate in transaction at the originating port for an export loan, at loading onto the ship, at unloading from ship, at gate out from destination port and in some cases at customer delivery. That is, at each of these points, someone (or in some cases optical recognition cameras) records the container number and has it entered into a software system which would keep track of each such entry so that at any point in the process, a shipper, consignee or other interested party could request an update on the progress of the goods.

In addition, with refrigerated containers, such interested parties may also inquire as to the environmental status of the goods, e.g., is the temperature at the requested levels and are there any alarms and/or other notable exceptions. To answer these questions and ensure that conditions are as requested, the shipping line or transportation company or container port or other container operator will periodically physically check the status of the reefer apparatus and read temperatures, check the machine for alarms and make adjustments as necessary.

This is achieved through the use of personnel on the ground at each facility or on board ships that climb ladders or racks and manually read and record the data displayed on the reefer's on-board microprocessor.

However, there are commercial, technical and operational weaknesses with the process described above for monitoring the health of the cargo in the reefers and maintaining the condition of the reefer machinery. In particular, the following are some of the weaknesses as seen from the perspective of the responsible party at the time of storage or transition, e.g. port operator, yard operator and ship operator:

High Labor expense—It's currently expensive to continually have highly-paid yard laborers check reefer status, set temperatures, pre-trip containers for use, sort alarms from good reefers and report back results. In addition, during off hours, when monitoring is still required regardless of the facility being open for business or not, this labor cost can increase dramatically with double or triple time wages.

Spoiled/damaged cargo—without continuous and real time visibility as to the condition of the cargo, cargo loss can result from unattended alarm conditions or other unscheduled operational changes.

Missed billing—The yard operator/owner can derive revenue for each reefer handled as well as the time spent in their yard and any temperature resets, powering the reefer on/off, alarms resets or additional readings for special cargo or customer requests. Currently with the manual process, it is often the case that these revenue points are not recorded correctly, or at all, and thus the yard operator is missing billing opportunities.

Customer Service—Often with special cargo, e.g. film, blood plasma, etc, the cargo owner/agent will call the yard/ship/facility to request manual intermediate readings from the reefer micro to gain assurance that the cargo is maintained correctly. It is currently very labor intensive, slow, expensive and disruptive to provide such customer feedback regarding the state of the cargo in the reefer while in their custody.

Lack of Visibility—There is a lack of real time visibility for the cargo owner and container operator alike.

Blind Spots—There are a number of transition phases where the reefer is in transition from an area where monitoring systems/processes exist (as described above) through which no system or personnel exist or can be easily deployed to ensure that the cargo is maintained as desired. In these transition phases, should an alarm occur or a reefer get out of temperature or some other nonconforming event happen, there is typically no way for a yard operator to know this, and thus potential exists for damage/spoilage to occur. Some of the typical transitions where this can occur is in the hand off from the yard to the ship or the ship to the yard or the yard to the trucker or rail where time can elapse and no monitoring takes place. Not having a defined start or stop point to these transition phases creates an indefinable "non-monitored"period which introduces risk.

There are some existing solutions that attempt to address these problems. Reefer power line technology provides for a radio frequency carrier applied over the power cord to a reefer that allows communications with the control system. This solution requires the permanent installation, usually at the time of reefer manufacture, of a power line modem (sometimes called an RMU). It also requires a significant infrastructure be installed on the ship and in ports and yards. Whilst widely installed on ships, this solution is much less prevalent on reefer containers and very few ports have installed the solution due to its expense and lack of overall ease of use with respect to the software and lack of integration with yard management systems. Further, suppliers of this technology are limited.

Other companies provide for wireless/satellite tracking solutions. These companies provide devices that are fitted with local RF, cellular or satellite radios with some form of power supply (battery, solar or other) that are typically permanently attached to the reefer and in some cases hard wired to the reefer's microprocessor. Furthermore, since reefers only pass through facilities, ports, yards, and vessels, these operators do not typically own the reefers and may not have permission to permanently attach any additional hardware.

Traditional solutions 10, such as shown in FIG. 1(a) and FIG. 1(b), do not lend themselves to fast installation or temporary usage since they require considerable effort in wiring and mounting and do not have the battery capacity to work when the reefer is not running for any practical length of time. These existing solutions are typically permanently mounted on the reefer and require hard wiring into the reefer control panel which involves opening the door, screwing down the wires on terminals, finding a mounting location for the device, finding a path for antenna wiring and finding a location on the outside of the panel for the antenna.

Finding a location for the traditional tracking device is very challenging since it is usually quite large and the antennas are separate items wired to the device. These traditional solutions are generally hidden inside the reefer machinery in such a way as to protect and store them safely. Further, traditional solutions are also typically orders of magnitude, more expensive to install and maintain and require subscription services with public wireless or satellite companies to gain continual reporting. It also requires all storage facilities to be on the same overall network.

Therefore, there is a significant need in the market for a device that can provide for continuous monitoring of mobile refrigerated containers without the drawbacks of the prior art as set out above.

SUMMARY OF THE INVENTION

The present invention provides for the monitoring, reporting and control of refrigerated containers at container ports, yards, rail ramps, on ships or wherever refrigerated containers are managed, held stored or transshipped through the use of wireless technology connected to an existing external data communications port on the face of a reefer container.

This existing connection point on the refrigerated containers allows the device of the present invention to be easily attached and detached by unskilled laborers for temporary or permanent use in seconds without any mechanical or electrical skills and operates without the need for external power sources for many years.

Data is transferred wirelessly between this device and a backend enterprise or web enabled software for analysis, control and display, using any wireless or wired LAN, cellular WAN or satellite communications. Alternatively, the data may be wirelessly transferred between the device of the present invention and another wireless device within or on the container which subsequently communicates this data with the enterprise software through any of the methods mentioned above.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE INVENTION

Although this invention is applicable to numerous and various types of monitoring systems, it has been found particularly useful in the environment of monitoring reefers. Therefore, without limiting the applicability of the invention to the above, the invention will be described in such environment.

Figure 1A:
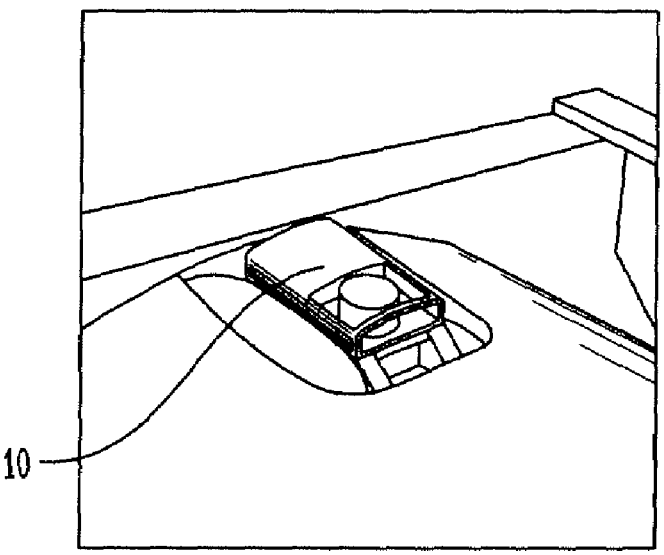
FIGS. 1(a) and 1(b) illustrates prior art solutions for monitoring reefers.
Figure 1B:
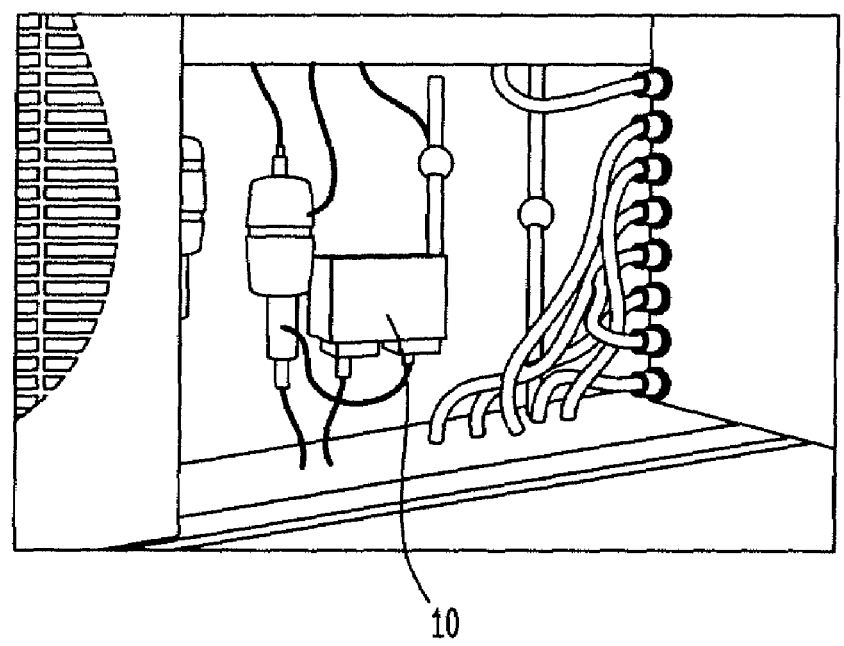
Figure 2:
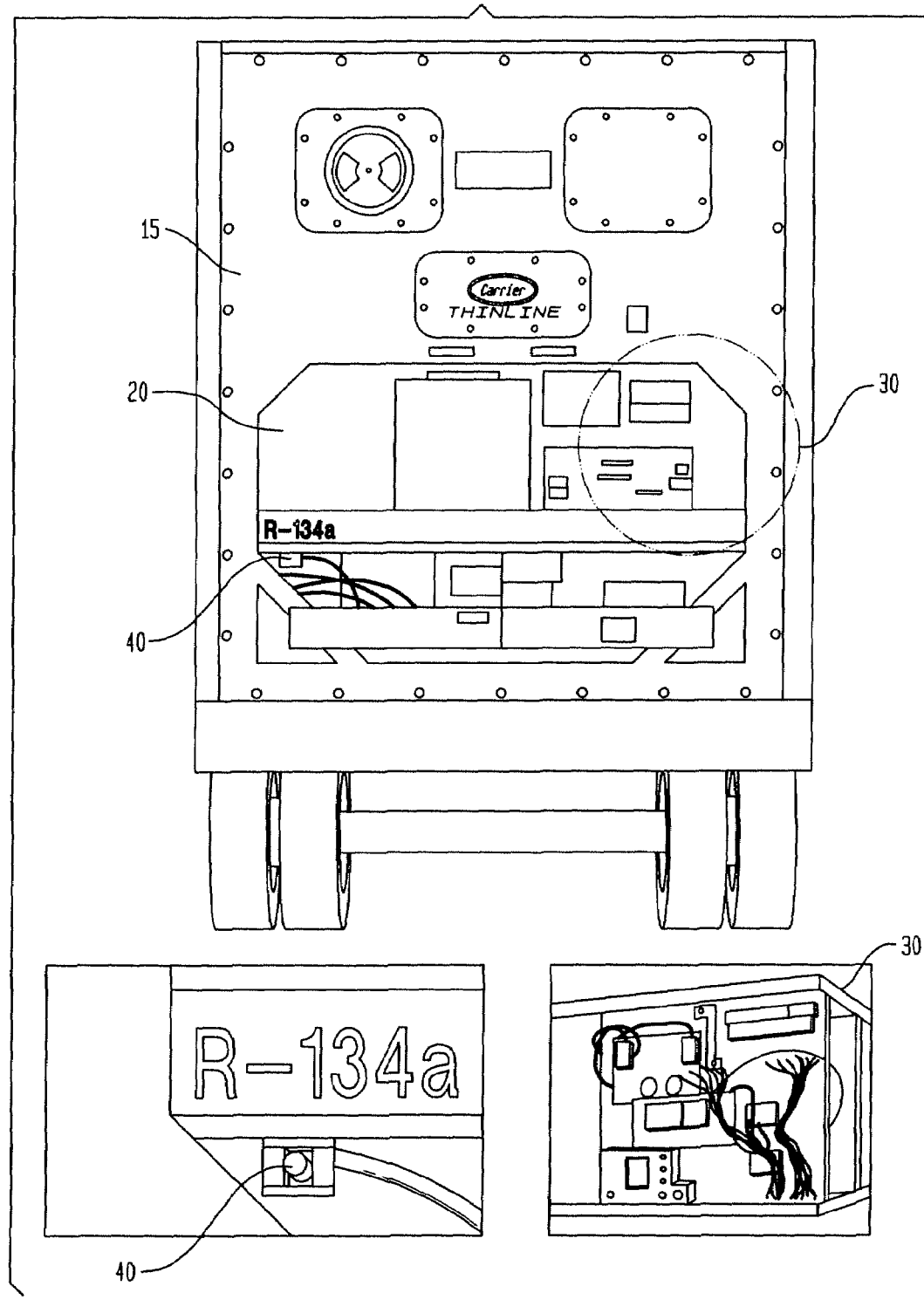
FIG. 2 illustrates an end of a reefer showing the reefer machinery and control computer.

FIG. 2 shows a typical end of a reefer 15. The reefer machinery 20 comprises a refrigeration apparatus and a control panel 30. Traditionally, a manual connection would be made behind the control panel with a hand-held device for viewing the status of the reefer. As stated above, such connections require an operator to physically go to the reefer and access the control panel with the hand-held device and the necessary wiring and/or mounting.

The present invention provides for a direct and removable connection to the control computer at a connection port 40. The connection port 40 already exists on all reefers and was previously used by mechanics when there was a request by a customer or the container operator to collect the data stored on the control computer. This process is usually called a data download and it is usually requested when there is some sort of claim or past issue with a shipment and someone wants to see a record of what occurred. The mechanic would take his PC and an appropriate connection cable and connect directly to this port and using appropriate software, download the data stored on the control computer. The data download is a one-time, costly operation to see if there is historical data that may support some previous claim. This port was not used for real-time, continuously-updated downloads and was deemed unusable for this purpose since it has no power and no data under normal circumstances.

Figure 3:
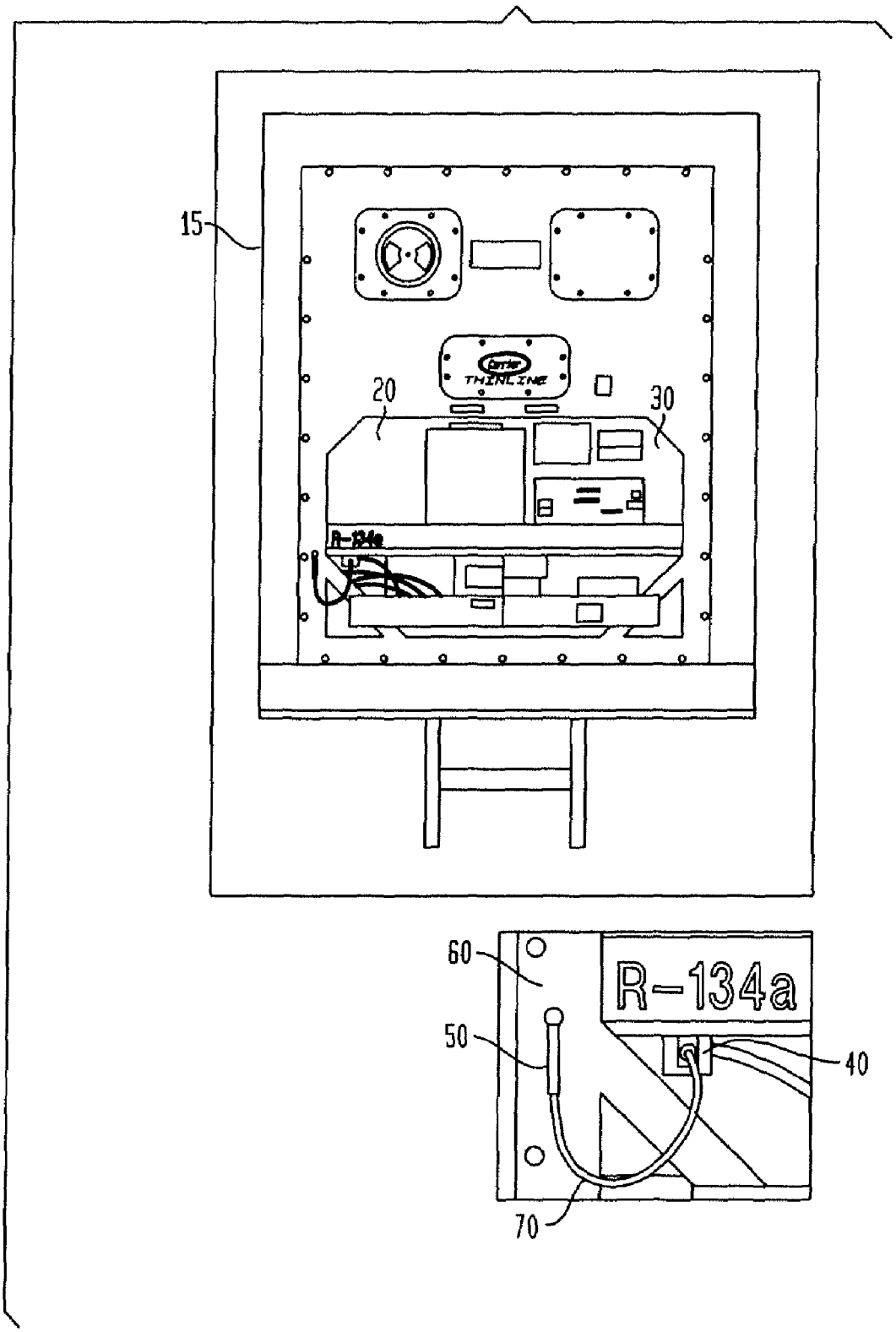
FIG. 3 illustrates an embodiment of the present invention located on the reefer.

The present invention utilizes this port to assist operators in managing refrigerated containers in real time and builds a historical record of the activities. As seen in FIG. 3, the device 50 of the present invention is connected the connection port 40. With the device attached to this port, the device will constantly download and wirelessly transmit real-time container conditions to a monitoring computer system allowing a terminal operator to have a full record of what occurred and what is occurring with a particular reefer. No longer does a particular operator have to be deployed to chase down containers and get these expensive manual downloads just to prove when an error took place.

Figure 4:
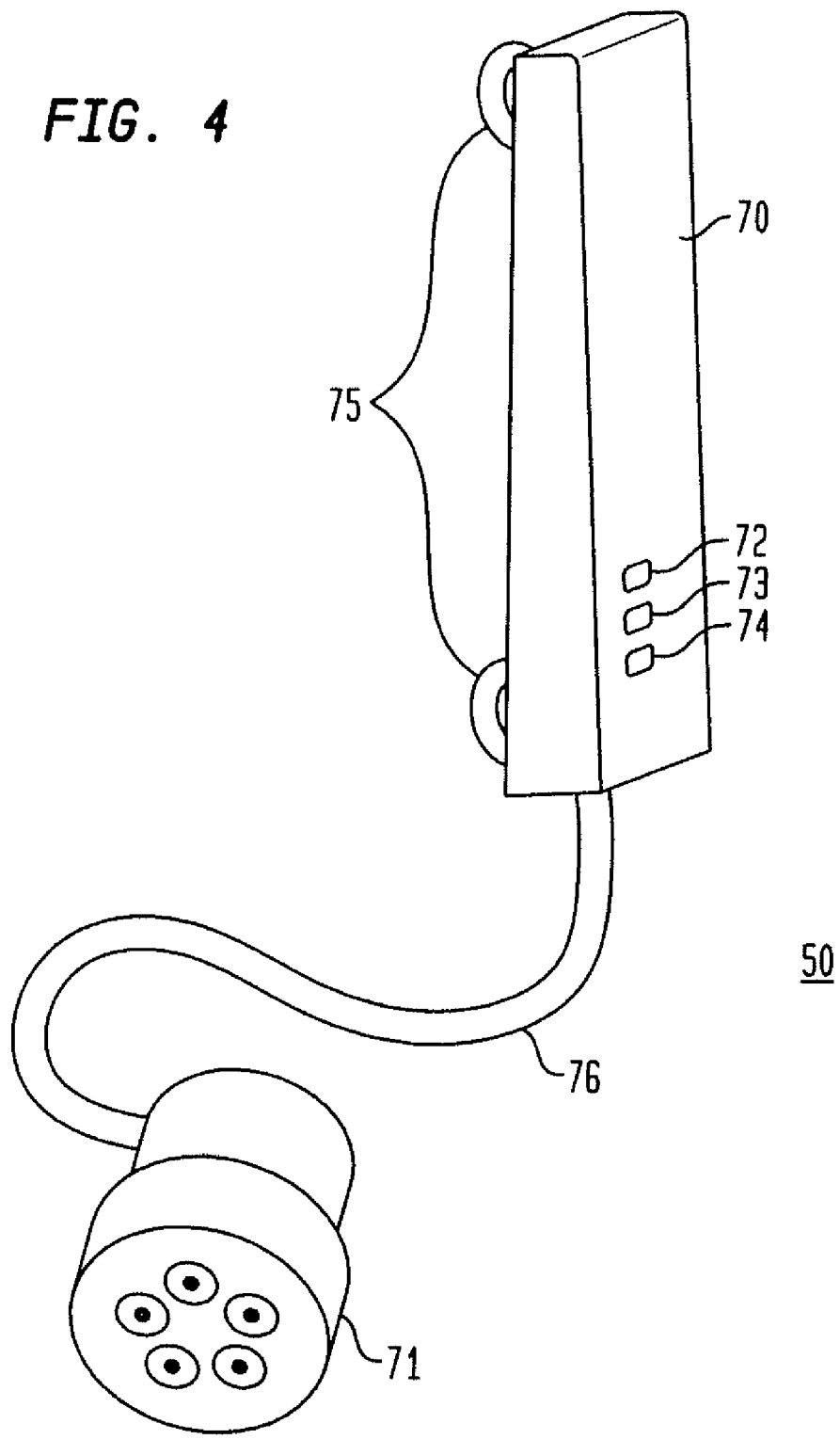
FIG. 4 illustrates an embodiment of the present invention detached from the reefer.

As shown in FIG. 4, the device 50 is a self-powered, long-lasting autonomous device that quickly and easily attaches to the existing data connection port 40. The device 50 includes a standardized quick latch connector 71, which can be part of the device casing 70 or on the end of a cable 76. The connector 71 allows the device 50 to be connected in seconds and the device is fully self-contained (there are no external power connections required nor are there any external antennas or other connections).

The device 50 may have a magnet 75 on the rear side of the device for attaching to the reefer frame 60 or any other ferromagnetic metal surface or the device may just hang in free space. The device 50 can remain permanently connected to the reefer 15 or be used in a temporary and detachable manner.

The device 50 may have three operation signals 72-74 located on the front side of the device 50. These operation signals 72-74 are used to visually aid in the proper placement and function of the device. These signals 72-74 may include a battery strength indicator 72, a power indicator 73 and/or a connection indicator 74. The battery strength indicator 72 may light up green if the battery level is at an acceptable strength and light up red when the battery falls below the acceptable strength. This will indicate when the battery needs to be replaced and/or charged. The power indicator 73 lights up green when the device is in the on position and red or not lit when the device is powered off.

The connection indicator 74 may light up green when the device is connected and working properly, orange if the device is on and does not have a connection with the reefer and red when connected to the reefer but is not receiving a wireless connection signal.

As previously described above, the present invention provides for wireless monitoring of refrigerated containers through a detachable reefer mounted device 50 that is connected to the reefer 15 at an existing external data communications port 40 on the reefer container 15. These monitoring services include reefer controller temperature and alarm monitoring, machinery and cargo inspections, reefer generator fueling and reefer repair and maintenance.

Figure 5:
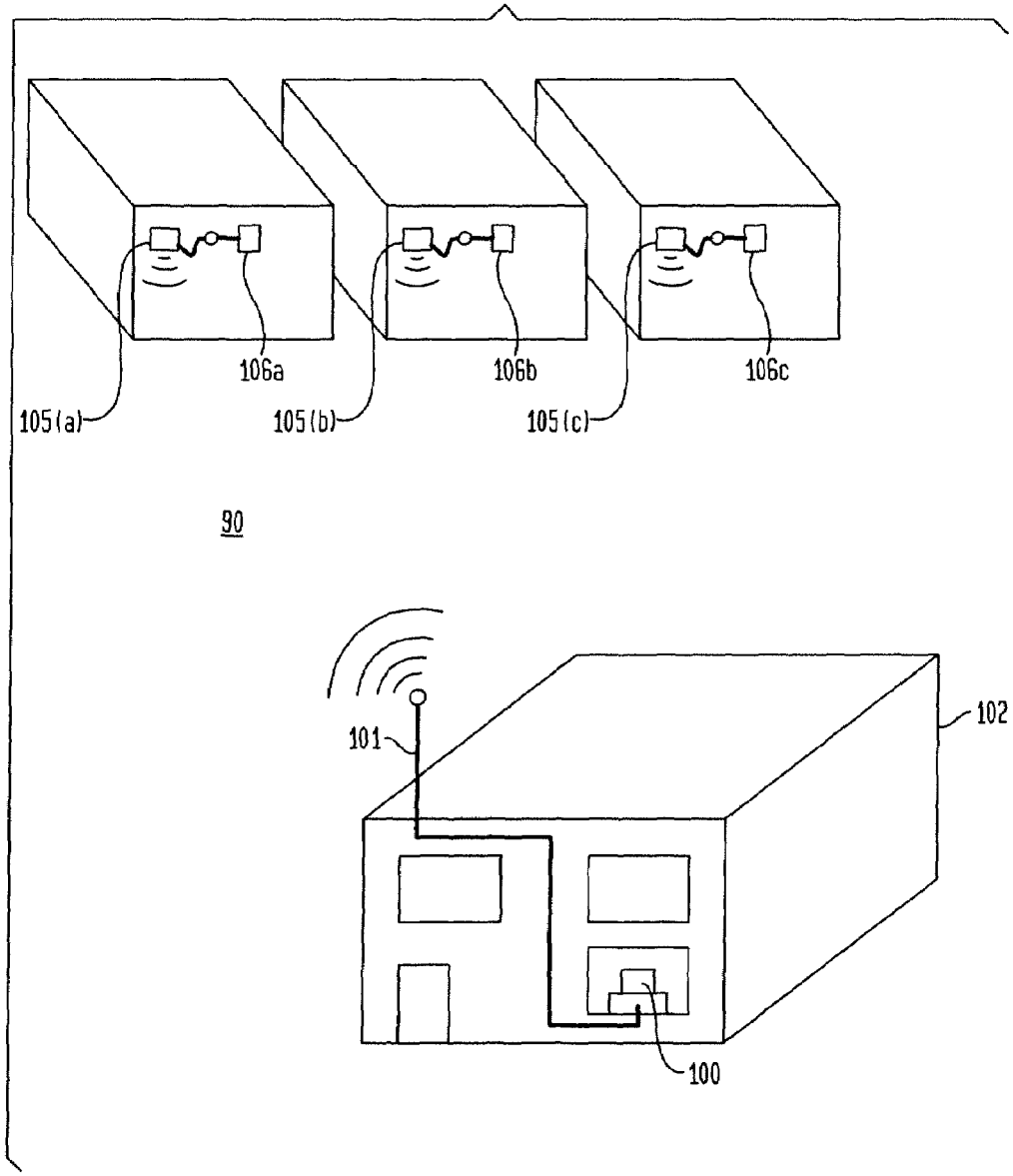
FIG. 5 illustrates the present invention as located within a monitoring system.

As shown in FIG. 5, a plurality of devices 105a-c are capable of interfacing with a corresponding reefer microcontroller 106a-c and communicating the reefer's status wirelessly to a remote software application 100. The software application 100 may be part of a wireless server 101 that may be located in one of the office buildings 102 onsite or elsewhere. The user may access the software application 100 may be through a secure login across either a wired or wireless computer network 101. The software application 100 is capable of not only managing all the tags 105a-c in the field but provide the customer with a unique web enabled graphical user interface to manage, control and report on all their reefer assets.

The software application 100 also allows for the system 90 to monitor if the data of the reefer is above/below a predetermined threshold and to make decisions and dispatch appropriate actions on the near real time wireless data flowing from the devices 105a-c. An example of an appropriate action may include the software application providing an alert to a user if the data of the reefer is above/below a predetermined threshold as well as reporting the reefer's status (reefer number, software versions, serial numbers, temperatures, alarms, and modes). The devices 105a-c can also determine their own connection status (connected to a reefer or not) and the reefer's power condition (powered or not).

Furthermore, the devices 105a-c allow full two way communications with the micros 106a-c so that any command that could be instructed to the reefer through the traditional means, i.e. the user input panel on the front of the reefer, can now be commanded from the device software, through the device and onto the micro. This allows for remote wireless control to do such things as change set temperatures, clear alarms, start and stop pre-trips or any other available command from a remote location.

The devices 105a-c can be installed at container ports, yards, rail ramps or wherever refrigerated containers are managed, held, stored or transshipped. Each facility may have its own tracking devices or the tracking devices may be shared between two or more facilities. Each facility can commonly manage upward of one thousand or more reefer containers at any given point in time therefore individual ownership of the tracking devices are preferred. Further, the wireless monitoring system is capable of managing such volume of reefers simultaneously. Many large container facilities can be in excess of two hundred acres; however, reefer containers are usually managed within certain boundaries.

Operation of the present invention will now be described. A reefer container 15 will arrive into a yard and be moved to the reefer area where it is to be powered and managed. At arrival into the facility, the container would make a move through a control gate and, a transaction is recorded in the yard's software management system. The software of the present invention can be connected to the yards software system and would then 'know' that a reefer has arrived and will 'expect' to 'see' it connected to the device 50 of the present invention at some predetermined time afterward. Although not necessary for the operation of and usefulness of the device, this linkage to the yards management system provides further benefits since the software can then display and link planned shipments to actual activities in the yard.

Either at the entry gate or when in position at the reefer area, the reefer operator/mechanic connects the device of the present invention 50 to the reefer's existing external data port 40. This existing data port 40 uses an industry standard quick release connector 71 for fast connection and disconnection. The device 50 will detect it's changed connection status and then proceed through an initiation process with the reefer to identify and collect the reefer's vital statistics (container ID, serial number, etc.) and report these wirelessly through a base station/gateway/server to the device software application. Based on the vital statistics of the reefer 15, the device 50 will enter into an operation mode and data extraction mode specifically suited to that reefer type. The reefer itself may be operated as normal and the device will continue to monitor and report on the status of the reefer 15.

Prior to the reefer 15 leaving the reefer area, the device 50 will typically be removed and returned to its storage location (box or hung near the reefer plug or wherever that facility has determined as a suitable location for storing the devices). The software system 100 will determine the disconnected state of the device 50 and will terminate and report the same to the software system. The backend software will then continue to report exceptions for the reefer it was connected to based on linkage with the yard's management system. For example, if the disconnected reefer does not gate out within a specified time the software system will notify the users. This same software can also be linked to the yard operators booking system so that it holds and watches for pre-booked reefer movements and again, can match these with actual activity on the ground.

The device inventory at any site will typically be managed by the reefer operator/mechanic. Devices that are not in use will typically be stored in a box in the mechanics truck or on open ground or hung near each reefer plug or wherever that facility has determined as a suitable location for storing the devices. At sites that use reefer racks, the devices may be permanently mounted on the rack frames with just the connection plug available for the operator to connect and disconnect from the reefers. When the device is used in this type of rack application, additional useful information is available to the user in the form of associating the reefer being monitored with the particular slot/stack location in the reefer rack. This makes it very easy for operators to identify quickly any reefer with an alarm or pre-trip failure. While overall device management will be facilitated through the software application, the device shall have a facility for indicating its operational state (LEDs or other similar application) so that the reefer operator/mechanic can determine the device's battery condition and operational state once connected to a reefer.

The server that hosts the device application will be some distance away from the reefer area—typically somewhere else on site but it could also reside off site or anywhere globally with an internet connection.

The device 50 may come in many forms and use any number of existing or future wireless technologies. In one embodiment, the device can be a radio frequency extraction device. This device is based on taking a traditional active Radio Frequency Identification (RFID) tag that has an internal serial port, making a wire serial connection to this internal serial port and bringing that wire 76 out of the tag case some distance. On the end of this wire 76 attached a specialized connector 71 capable of mating with the external data port of the reefer. The traditional RFID tag would then have additional firmware written to it which contains proprietary protocols and operation logic to allow the device, once connected to the data port 40 of the reefer 15, to communicate and if required, control the reefer machinery.

The RFID tag's internal RF module may also allow for communications with the outside world through the use of long-range RFID readers and reader nodes. Container yards are a challenge for any RF communications due to the quantity of metal objects in them and the dynamic positioning of stacked containers. The present invention needed to allow for easy installation with minimum 'tuning' to accommodate normal reefer operations. Long range robust RFID communications coupled with long range enterprise Wi-Fi allowed the present invention to overcome issues that would otherwise have affected performance.

The reader nodes may be an external enclosure which includes an RFID reader, a wireless LAN card, power supplies, a wireless LAN antenna, and RFID antenna. The readers are packaged together with long range Wi-Fi and power supplies into an external weather proof enclosure which is mounted 30+ feet on a building or light pole. The reader nodes may also be installed on the roof of a building with full visibility of the full yard or the reader node may cover a limited area of the yard that contains all refrigerated reefers.

The use of these RFID tags also allows the device to have a long operation life which would be otherwise very challenging for traditional wireless monitoring devices. That is, the device can be self powered and capable of operating for many years under normal use. While connected, the device shall update its and the reefer status on an automatic and user definable interval, e.g. every minute, every five minutes, every hour, ect. When disconnected the device will be required to report its status (connected/not connected, battery level, etc.) once or more times per day.

The device shall have the ability to reduce or increase reporting based on its power and/or connection status and timing logic. For example, if connected it would report its status as normal, and if disconnected and not re-connected within a predetermined time, terminate the reporting window and go into standby/sleep mode.

Another embodiment could see it use an internal rechargeable battery which can be powered by charging dock, solar power, vibration or trickle charged from the reefer when connected. The device state can determine and report which power source is in use—internal battery, external battery/charger, reefer line power, etc.

The device may be capable of notifying the software application of battery level and alerts when battery level is low. The device may have a visible indicator on the device to allow the user to determine if the device has a good or weak battery and if the device is operating properly, i.e. status LEDs for communication and battery status.

The device may have additional inputs/outputs, wired or wireless and may be able to determine and report the power condition of any connected reefer, i.e., is the reefer being powered or not.

The device shall be capable of polling the reefer's micro for particular tables, blocks, bits or bytes periodically on user definable intervals and report the results. The device shall be capable of managing and transmitting table and block results, e.g., 255 byte packets, either in single or part transmissions.

The device may contain a tamper or connection mounted switch to indicate the device is either mounted in position or has been removed from operational position.

The device may offer read/write capability for attribute setting (trip headers, ID, originating/commissioning location, owner, etc.), polling and changing parameters, macro re-setting, etc. The device provides support for hand held readers.

The device may offer locating capabilities so users can determine precisely where on the facility the reefer and tag are located. This can be done using GPS or other wireless algorithms.

The application of the device will typically see it mounted on unmanned assets (containers and container related equipment) and exposed to harsh weather and industrial conditions typical of intermodal yards. Any exposed module, connectors, sensors or cables will be weather resistant, suitable for exposure to oil/salt/diesel/UV and high vibration. All hardware is designed to fit and operate in these exposed conditions on road and rail transportation assets without service for at least 3 years.

There are many benefits of remote wireless monitoring over the use of manual physical monitoring. The device of the present invention is user friendly, inexpensive, easy to attach/detach, and uses an existing data port on the reefer containers for the connection. Therefore, no other hardware is necessary or required to be installed on existing reefer containers. Traditional technology based monitoring solutions require wireless/satellite devices to be more permanently connected to internal wiring of the refrigerated container's microprocessor or use RF communications via the power cord, or are attached to the reefer and operate independently of the container's microprocessor machinery.

The present invention provides significant advantages over the prior art, including the use of an existing data connection port not previously used for this purpose. It is small, inexpensive, easy to use, connect and disconnect and is self-powered. The combination of the unique connection port and the device attributes open up new opportunities for the reefer manager/operator—they can consider using the device in a detachable fashion for all reefers passing through their facility, they can "see" all their reefers operating parameters at once any time, they can reduce labor required to manage reefers, they can reduce reefer cargo spoilage and thus insurance claims by knowing alarm conditions exist in a timely manner and directing labor to fix any problems. These opportunities were previously not practical or economical with traditional solutions.

The device of the present invention is simple, low cost and very easy to use yet it delivers vital statistics as to the condition of cargo inside refrigerated containers at any point in the transportation chain. The device delivers volumes of data on the condition of the cargo while also allowing full control over the refrigeration machinery should pretrips, temperature or other changes be required. The device is capable of reading all existing conditions on the reefer, reading and clearing alarms and performing fully automated pre-trips. No public wireless network or satellite communications fees are required and the device can be attached or detached in seconds for in-yard temporary monitoring or it can be permanently fitted to a reefer for always available operations depending on the user's desires.

The device operates completely independent of reefer power giving full visibility and the freedom to monitor anywhere. It can insure against unprotected gaps in the transportation chain such as movements from ship to shore, from keyside to the reefer yard, in reefer racks, at loading and unloading and while sitting in any yard, moving on the rail or on road or on vessels. The accompanying software not only shows all reefer activity and provides cargo and equipment alerts but integrates with existing terminal operating software systems so additional long dwell and other operational alerts can be generated. The software provides an intuitive user interface for viewing all reefers in any facility and easy controls for data downloads and pretrip commands.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method of collecting data from a reefer, the method comprising:
   connecting an autonomous monitoring device on the reefer at a data connection port, the data connection port providing a direct connection to a control computer of the reefer;
   collecting the data related to the reefer; and
   wirelessly transmitting the data to a management system and wirelessly receiving management data from the management system,
   wherein, when the autonomous monitoring device is connected to the reefer, the autonomous monitoring device updates its own and the reefer status to the management system on an automatic and definable interval, and when the autonomous monitoring device is not connected, the autonomous monitoring device updates its own status to the management system at least once a day.

2. The method of collecting data from the reefer of claim 1, further comprising:
   providing two-way communications to reefer machinery.

3. The method of collecting data from the reefer of claim 2, further comprising:
   sending control instructions to the reefer.

4. The method of collecting data from the reefer of claim 1, further comprising:
   disconnecting the monitoring device.

5. The method of collecting data from the reefer of claim 1, wherein the monitoring device is a radio frequency extraction device.

6. The method of collecting data from the reefer of claim 1, wherein the device uses a radio frequency identification (RFID) tag.

7. The method of collecting data from the reefer of claim 1, further comprising:
   mounting the device on a reefer frame.

8. The method of collecting data from the reefer of claim 5, wherein the device is detachable.

9. The method of collecting data from the reefer of claim 1, wherein the management data includes commands related to at least one of set temperature, clear alarms, start pre-trips and stop pre-trips.

10. The method of collecting data from the reefer of claim 1, wherein the device has an internal rechargeable battery.

11. The method of collecting data from the reefer of claim 1, further comprising:
    alerting a user if a battery level of the device is low.

12. A device for collecting data from a reefer, the device comprising:
    an autonomous monitoring device for obtaining the data from the reefer and wirelessly transmitting the data to a management system, and wirelessly receiving control commands from the management system and sending the control commands to the reefer; and
    a connector connected to the monitoring device at one end and connected to a connection port of the reefer at the other end, the connection port providing a direct connection to a control computer of the reefer,
    wherein, when the autonomous monitoring device is connected to the reefer, the autonomous monitoring device updates its own and the reefer status to the management system on an automatic and definable interval, and when the autonomous monitoring device is not connected, the autonomous monitoring device updates its own status to the management system at least once a day.

13. The device for collecting data from the reefer of claim 12, the device further comprising:
    a magnet for attachment of the device to a reefer frame.

14. The device for collecting data from the reefer of claim 12, wherein the monitoring device is a radio frequency extraction device.

15. The device for collecting data from the reefer of claim 12, wherein the device uses a radio frequency identification (RFID) tag.

16. The device for collecting data from the reefer of claim 12, wherein the device has an internal rechargeable battery.

17. A software management system for collecting and monitoring data of a reefer, the software management system comprising:
- an autonomous monitoring device for obtaining the data from the reefer at a data connection port of the reefer and wirelessly transmitting the data, the data connection port providing a direct connection to a control computer of the reefer; and
- a software system for receiving the data, monitoring a status of the reefer based on the data received and dispatching a control command to the reefer if the data of the reefer is above/below a predetermined threshold,
- wherein, when the autonomous monitoring device is connected to the reefer, the autonomous monitoring device updates its own and the reefer status to the software system on an automatic and definable interval, and when the autonomous monitoring device is not connected, the autonomous monitoring device updates its own status to the software system at least once a day.

18. The software management system for collecting and monitoring data of the reefer of claim 17, the software management system further comprising:
- a server for storing the data received by the software system.

19. The software management system for collecting and monitoring data of the reefer of claim 17, the software management system further comprising:
- a user interface for viewing the reefer and additional reefers located in a facility or vessel.

20. The software management system for collecting and monitoring data of the reefer of claim 17, wherein the software system provides an alert to a user if the data of the reefer is above/below a predetermined threshold.

21. The software management system for collecting and monitoring data of the reefer of claim 17, wherein the monitoring device is a radio frequency extraction device.

22. The software management system for collecting and monitoring data of the reefer of claim 17, wherein the device has an internal rechargeable battery.

23. The software management system for collecting and monitoring data of the reefer of claim 17, wherein the control commands include at least one of set temperature, clear alarms, start pre-trips and stop pre-trips.

24. The method of collecting data from the reefer of claim 1, wherein the management system provides for analysis and control of the reefer.

25. The method of claim 1 wherein, if the autonomous monitoring device is disconnected from the reefer and not reconnected within a predetermined time, the management system terminates a reporting window.

26. The device of claim 25 wherein, if the autonomous monitoring device is disconnected from the reefer and the reefer does not gate out from a storage area within a specified time period, the management system will issue a notification.

27. The device of claim 12 wherein, if the autonomous monitoring device is disconnected from the reefer and not reconnected within a predetermined time, the management system terminates a reporting window.

28. The device of claim 27 wherein, if the autonomous monitoring device is disconnected from the reefer and the reefer does not gate out from a storage area within a specified time period, the management system will issue a notification.

29. The software management system of claim 17 wherein, if the autonomous monitoring device is disconnected from the reefer and the reefer does not gate out from a storage area within a specified time period, the software system will issue a notification.

30. The device of claim 29 wherein, if the autonomous monitoring device is disconnected from the reefer and not reconnected within a predetermined time, the software system terminates a reporting window.

* * * * *